United States Patent [19]
Anderson et al.

[11] 3,936,954
[45] Feb. 10, 1976

[54] ELECTRONIC BEARING SELECTOR FOR OMNI-DIRECTIONAL SIGNALS

[75] Inventors: Warren A. Anderson, Tiverton, R.I.; Lawrence Rosenberg, Fairlawn; Melvin H. Damon, Jr., Wayne, both of N.J.

[73] Assignee: The United States of America as represented by the Secretary of the Navy, Washington, D.C.

[22] Filed: May 27, 1964

[21] Appl. No.: 370,736

[52] U.S. Cl. .............................................. 35/10.4
[51] Int. Cl.² ........................................... G09B 9/00
[58] Field of Search ...................... 35/10.4; 343/7.3

[56] References Cited
UNITED STATES PATENTS
3,300,568  1/1967  Sear .................................... 35/10.4

*Primary Examiner*—T. H. Tubbesing
*Attorney, Agent, or Firm*—Richard S. Sciascia; John W. Pease

EXEMPLARY CLAIM

1. An electronic circuit for use with apparatus having timing signal generating clock means and means for combining waveform information from a plurality of input channels into a single pulse train signal wherein time displacements of particular recurrent pulses along the pulse train signal time base, as established by said clock means, are indicative of the channels from which the particular pulses were derived, said electronic circuit comprising:

phase-splitter means responsive to said timing signal to provide two, timed, sine wave signals of equal magnitude but having a predetermined phase difference;

phase-shift resolver means connected to said phase-splitter means and having a stator and a rotor, said resolver being responsive to said timed sine wave signals and to the position of said rotor to provide a resolver output signal which is phase-shifted with respect to said time base in accordance with the position of said rotor;

gate shaping means connected to said phase-shift resolver means and responsive to said resolver output signal to provide a sliding gate signal which is positioned along said time base in accordance with the position of said rotor;

multiplier means for receiving said pulse train signal and connected to said gate shaping means and responsive to said sliding gate signal so as to provide an output corresponding to coincidence of said sliding gate signal and pulses of said pulse train signal, whereby positioning of said rotor can be utilized to select from said pulse train signal those pulses derived from particular ones of said plurality of input channels;

said multiplier means comprising means for forming said gate signal into a plurality of gate signals of differing widths and signal levels for passing coincident pulses within those widths, and summing means for summing the pulses so passed to provide smooth transition between different outputs resulting from changes in said rotor position.

2 Claims, 9 Drawing Figures

NOTES:
1. UNLESS OTHERWISE SPECIFIED:
   RESISTANCE VALUES ARE IN OHMS,
   CAPACITANCE VALUES ARE IN
   MICROFARADS.

INVENTORS
WARREN A. ANDERSON
LAWRENCE ROSENBERG
BY  MELVIN H. DAMON, JR.

Lawrence S. Epstein
ATTORNEYS

ELECTRONIC BEARING SELECTOR FOR OMNI-DIRECTIONAL SIGNALS

The present invention pertains to electronic circuitry for use in a training device and is particularly directed towards an electronic circuit for simulation of signals in a sonar training system. In operational sonar systems when it is desired to scan or search over a particular area or over a 360° circle about the sonar location, the sonar operator has available mechanical scanning equipment which directs the sonar beam to the particular point of scan that the operator desires. In order to simulate such scanning or directional sonar information, the present invention is utilized to simulate such directional scanning.

It is therefore an object of the instant invention to provide a novel electronic circuit for simulation of operational sonar scan.

Another object of the instant invention is to provide a novel electronic circuit for simulation of sonar scanning, said novel electronic circuit being simple in construction and inexpensive to build.

A further object of the instant invention is to provide a novel electronic circuit which will provide variable control over selection of information from a combined signal derived from a large number of different input channels.

Other objects and many of the attendant advantages of this invention will be readily appreciated as the same becomes better understood by reference to the following detailed description when considered in connection with the accompanying drawings wherein:

One preferred embodiment of the invention is utilized with a trainer which simulates an operational sonar system which has the following characteristics. The information is provided in 48 discrete channels which are linearly spaced about the circumference of 360°. The information in each channel is limited to the information from one segment which is 1/48 of 360° or 7½° for each channel. This is analogous to the beam width of the particular sonar set being simulated.

The information from each of the 48 channels is combined by known time sharing multiplexing techniques to provide a single aurel signal comprising a train of amplitude modulated pulses, the amplitudes of which correspond to frequencies of the input at individual channels, while the time displacements of the aurel pulses along the signal time base are representative of the particular input channels, or bearing in this example wherein each channel represents 7½° of bearing in a sonar device. This pulse train or combined aurel signal (so called to distinguish from various audio frequency signals in the simulator device embodying the invention) constitutes an input signal applied to input line 43 of FIG. 1.

The invention described hereinafter provides the means for extracting from that combined aurel signal those aurel pulses corresponding to a selected bearing, and for converting or reconstituting therefrom the original audio input to the channel corresponding to that bearing. This the invention accomplishes through the agency of novel "sliding gate" means.

By a sliding gate is meant a gating signal which can be selectively positioned, in time, along the time reference base of the combined aurel signal in accordance with a selected bearing sought to be scrutinized. The aurel pulses which coincide with the selectively positioned sliding gate are thereby gated to suitable means for reconstituting them as an audio signal which can be utilized to drive a loud speaker, for example.

Thus, if a sonar trainee wants to study the return from a certain bearing and operates a bearing selector to select that bearing, the sliding gate means picks out those aurel pulses which were derived from the input channel corresponding to the desired bearing.

Figure 1:
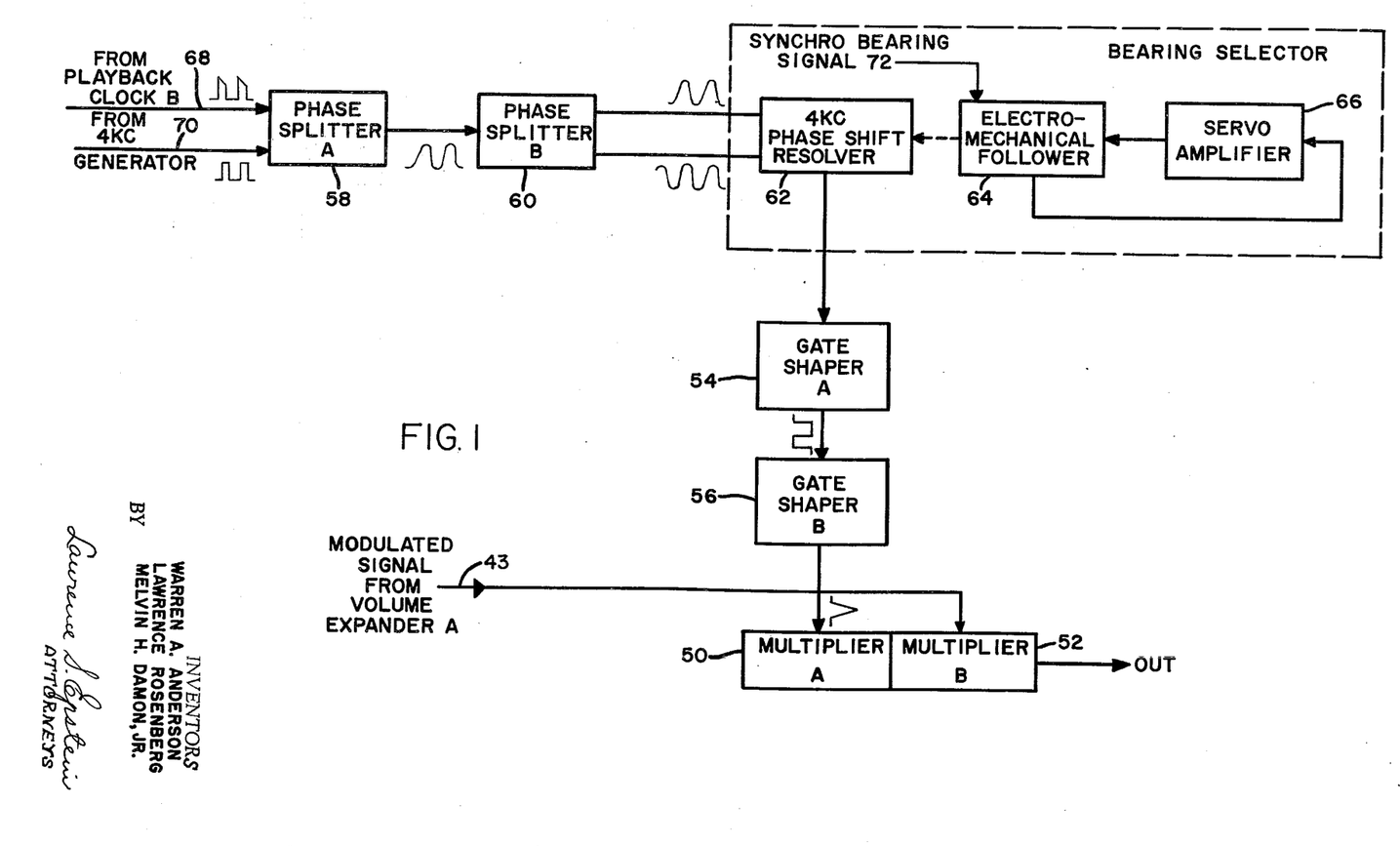
FIG. 1 is an overall block diagram of the omni-directional bearing selector circuitry.
Figure 3:
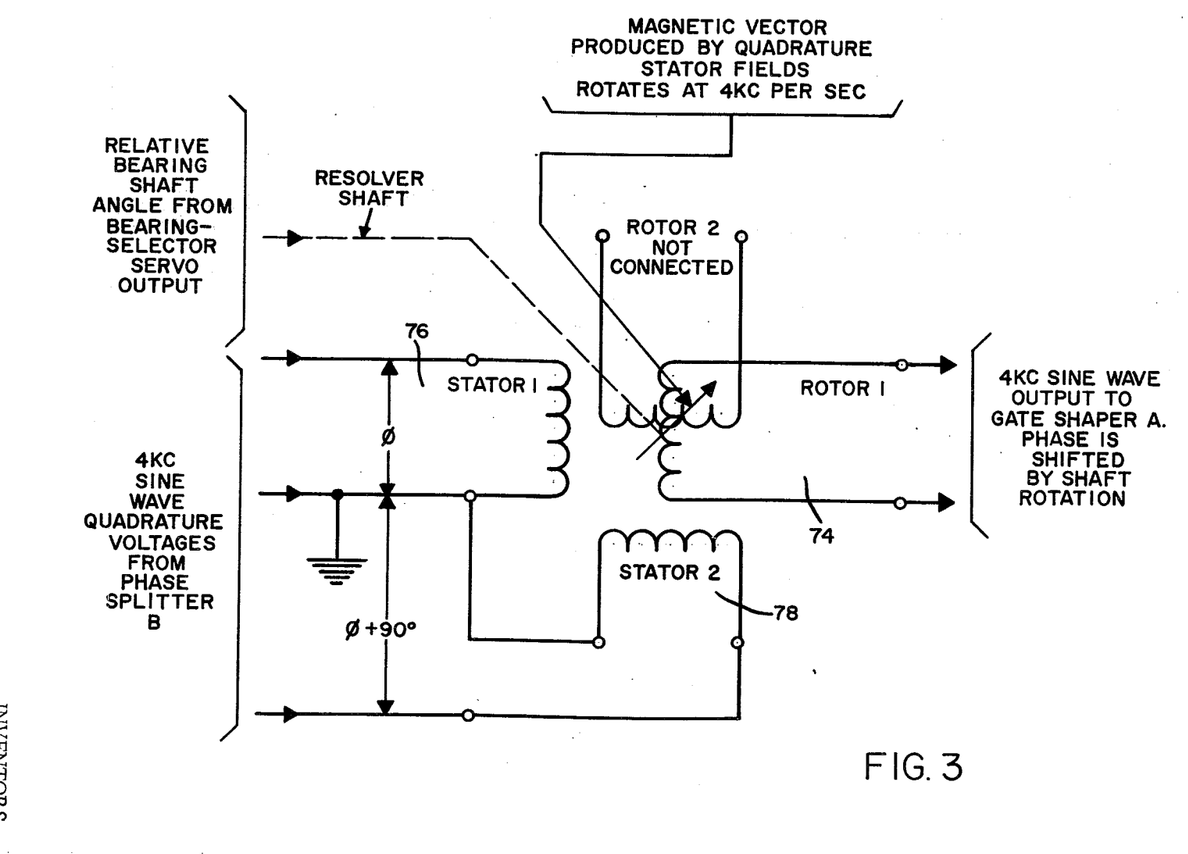
FIG. 3 is a schematic diagram of the phase-shift resolver.
Figure 4A:
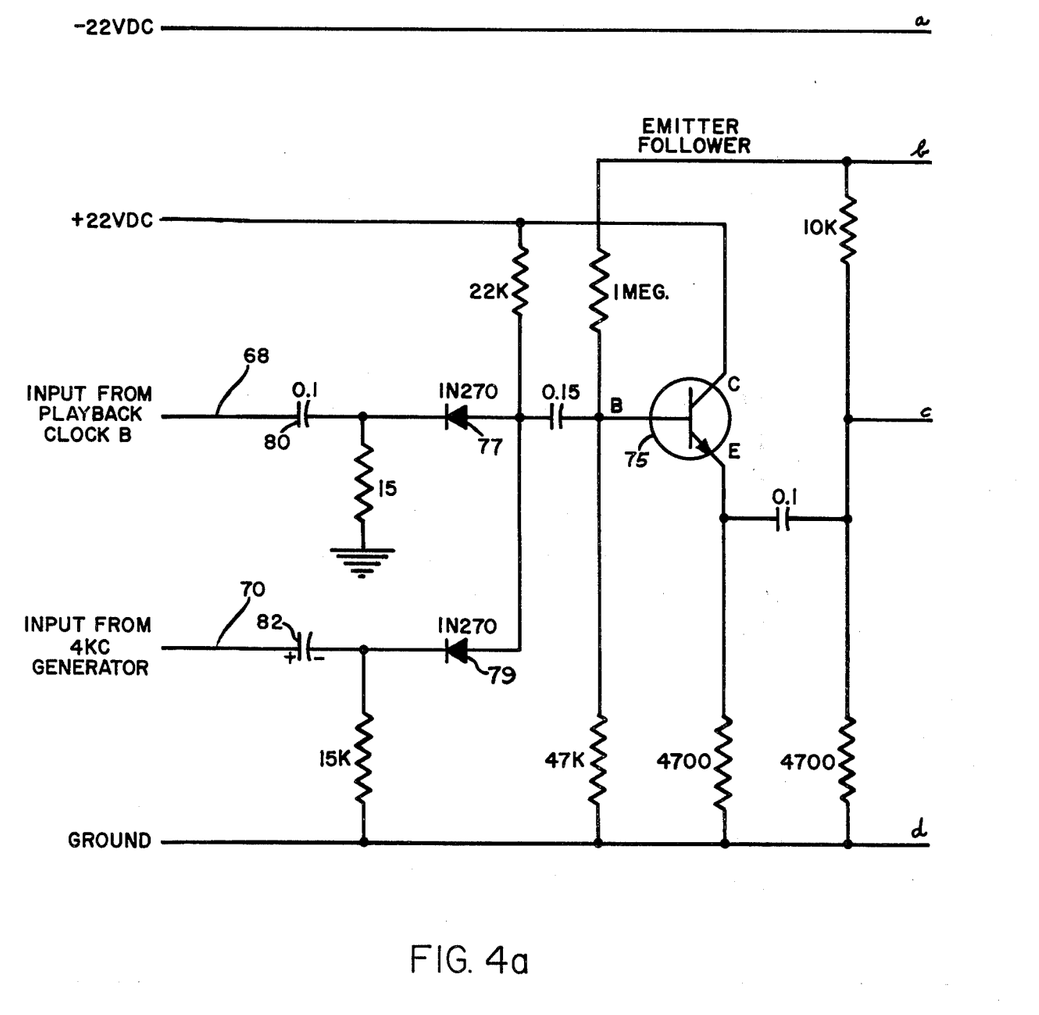
FIGS. 4a–4d is a schematic diagram of phase-splitter A utilized in the bearing selector.
Figure 4B:
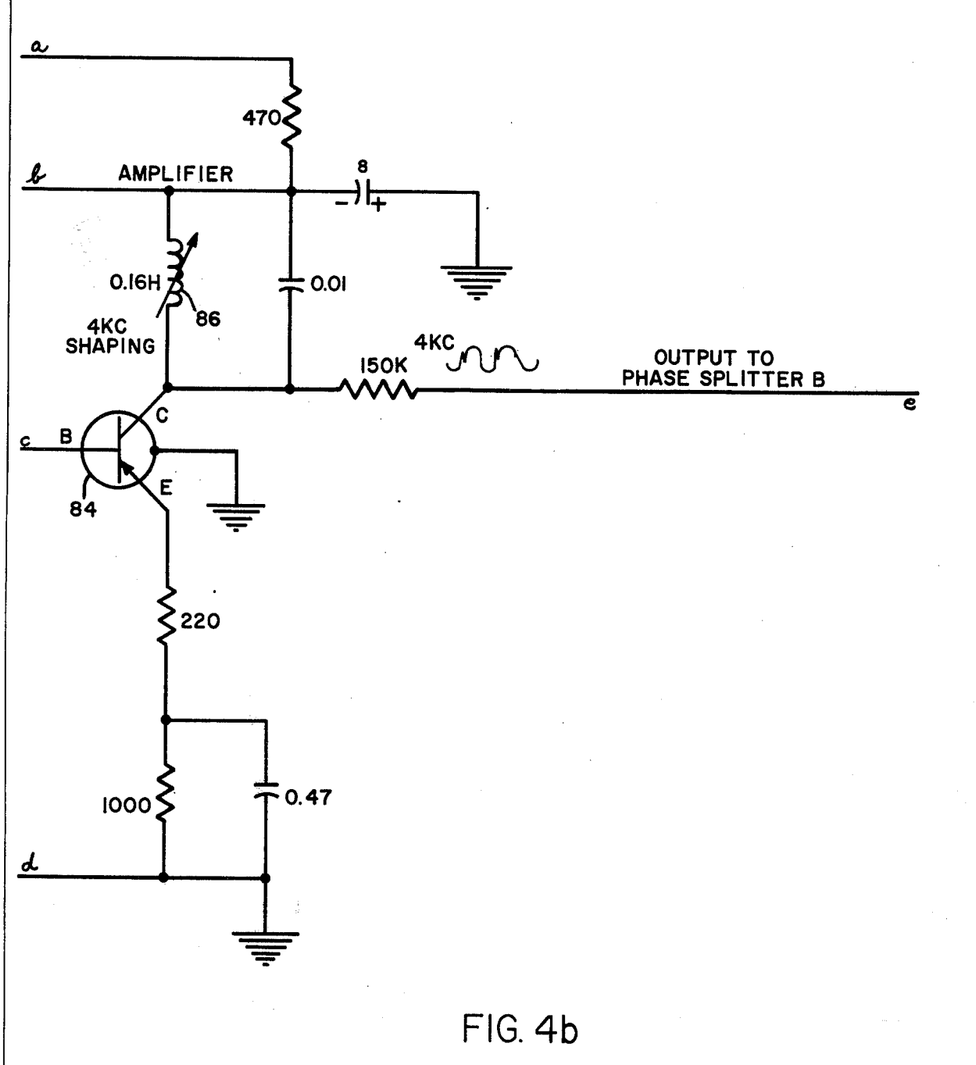
Figure 4C:
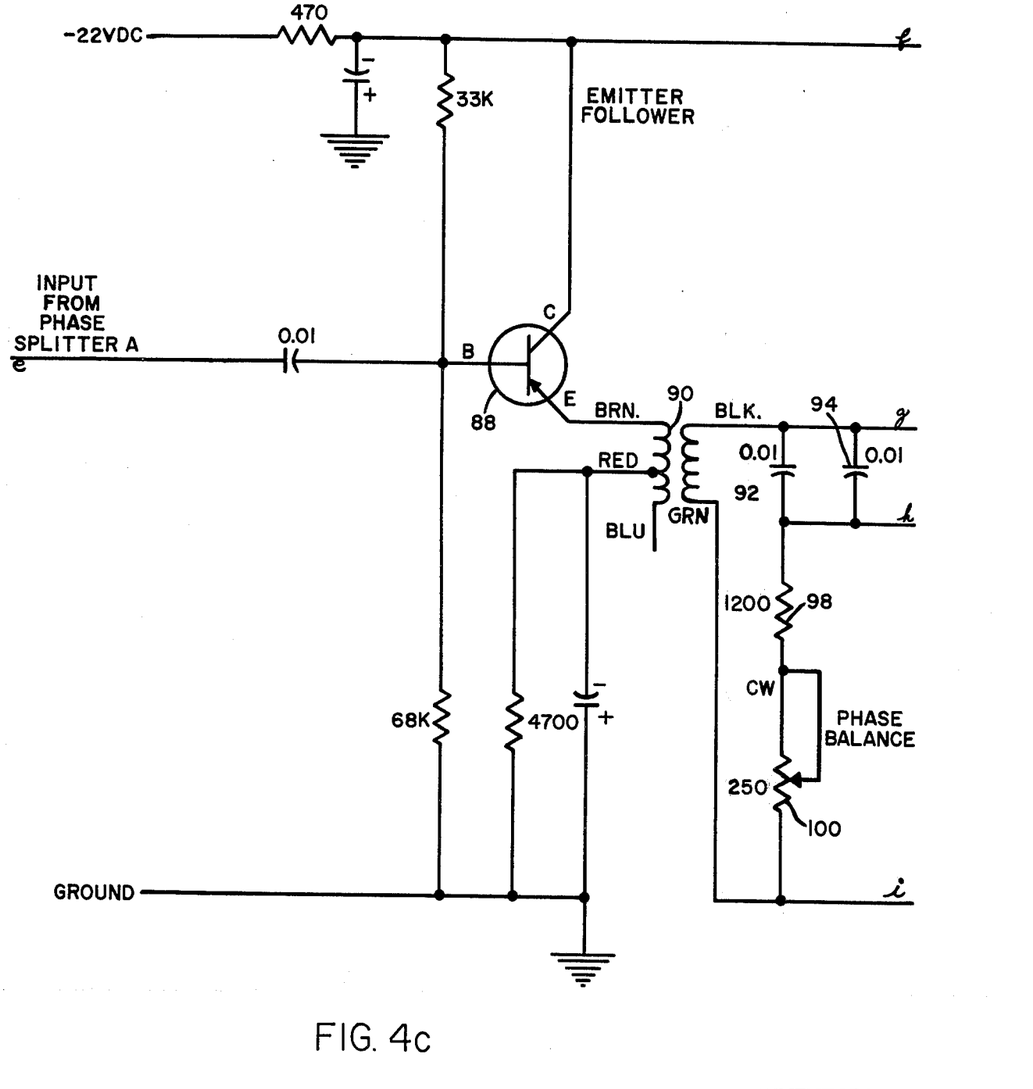
Figure 4D:
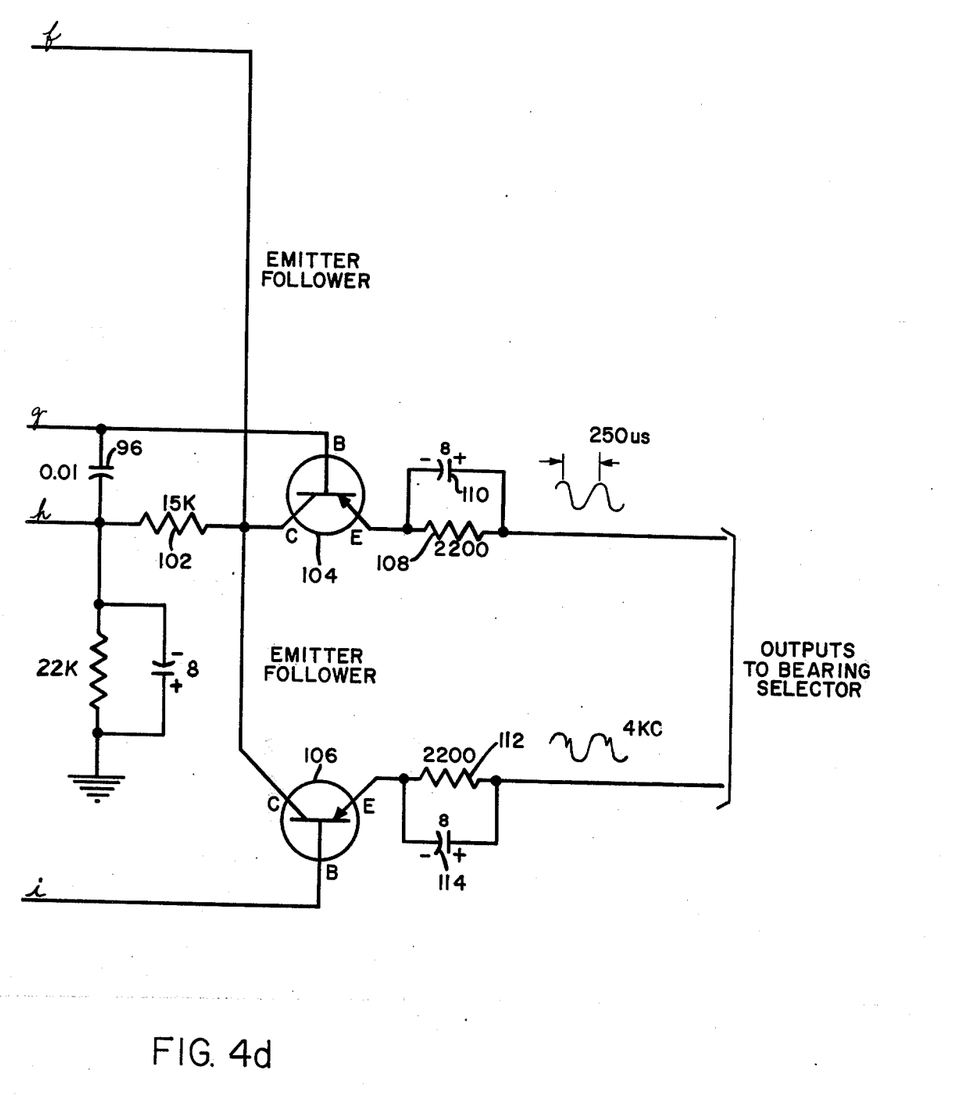

Referring now to FIG. 1, the bearing selector circuitry comprises multiplier A, 50, multiplier B, 52, gate-shaper A, 54, gate-shaper B, 56, phase-splitter A, 58, phase-splitter B, 60, and the bearing selector circuitry comprising the 4KC phase-shifter resolver 62, the electro-mechanical follower 64 and the servo amplifier 66. The phase-splitter A, 58 receives input waveforms on lines 68 and 70 respectively from a play-back clock B and a 4KC generator. These input waveforms are shown in FIG. 1. The playback clock (not shown) derives the mentioned waveform from another clock means and serves to provide proper timing or synchronization of the system being described with the system which combined the plural channel inputs into the combined aurel signal. The outputs from phase-splitter A, 58 are fed to a phase-splitter B, 60 in the form of two pulses, one of which is superposed on the other. The phase-splitter components A and B actually operate together to perform a single electrical function, that is to provide two, 4KC output signals one of which is 90° out of phase with the other. The outputs from phase-splitter B, 60 are fed to a bearing selector 4KC phase-shift resolver 62. The output from this resolver is fed to gate-shaper A, 54, then to gate-shaper B, 56, then to multiplier A, 50 and then to multiplier B, 52. The output of the electro-mechanical follower 64 is fed to the 4KC phase-shift resolver. The 4KC phase-shift resolver is shown in FIG. 3. It comprises a rotor 74 and two stators, 76 and 78, which are 90° out of phase with each other. In order to actuate a phase-shift resolver 62, it is necessary to provide signals for the stators of this resolver which are 90° out of phase with each other. These are two, equal amplitude, timed, sine wave output signals provided by phase-splitter A, 58 and B, 60. These voltages being 4KC sine waves therefore develop a rotating magnetic field in the resolver which rotates at 4KC per second as indicated in the caption at the top of FIG. 3. The magnetic vector shown in FIG. 3 is not a physical element but is a symbolic representation of the vectorially combined forces or fields which result from the 4KC quadrature voltages applied to stators 76 and 78. The synchro bearing selector signal 72, which is a typical synchro signal generated by a rotary transformer or the like operated as by a bearing selecting handwheel, indicates the particular bearing to be selected by the bearing selector circuitry. The bearing selector circuitry which comprises the 4KC phase-shift resolver 62, the electro-mechanical follower 64 and the servo amplifier 66 produces a shaft position which is analogous with the input synchro bearing signal. This shaft position of the bearing selector servo controls and adjusts the shaft position or the rotor shaft position of the 4KC phase-shift resolver 62. The phase-shift resolver 62 is responsive to the timed, sine wave signals from the phase-splitter means, and to the position of the resolver rotor to provide a resolver output signal which is phase shifted with respect to the time base in accordance with the position of the resolver rotor.

Referring now to FIGS. 4a–4d, input signals from the playback clock and the 4KC generator, respectively supplied on lines 68 and 70, are applied through a summing circuit to the transistor 75. The summing circuit includes diodes 77 and 79 which together with the 22K resistor connected between their anodes and the positive 24 volt DC source form a gate circuit of the type shown in FIG. 2-1(a), page 38, of "Digital Computer Components and Circuits" by R. K. Richards. These input signals are applied through capacitors 80 and 82 and enter the base of emitter-follower transistor 75. Transistor 75 is an impedance matching cathode follower circuit component. The outputs for the emitter-follower are applied to the base of the following amplifier 84. Amplifier 84 utilizes an inductance network 86 for peaking which serves to filter the input pulse information to the phase-splitter and produce an output to which is sinusoidal in shape. The output from the phase-splitter A is applied to phase-splitter B which has an emitter-follower 88 as its first stage. The output from emitter-follower 88 is transformer coupled by transformer 90 to a three-stage RC phase shifter which provides the required approximate 90° phase shift. This phase-shifter comprises capacitors 92, 94, 96 and associated resistors 98, 100, and 102. The output of this phase-shifter is applied to push-pull amplifiers 104 and 106. The input signals to these push-pull amplifiers are phase-shifted 90°. The outputs from these push-pull amplfiers are therefore 90° out of phase with each other and the RC networks in each of the emitters of amplifiers 104 and 106, respectively RC combination 108 and 110 and the RC combination 112 and 114, serve to tune out the subsequent stator inductance of the phase-shift resolver.

Figure 5:
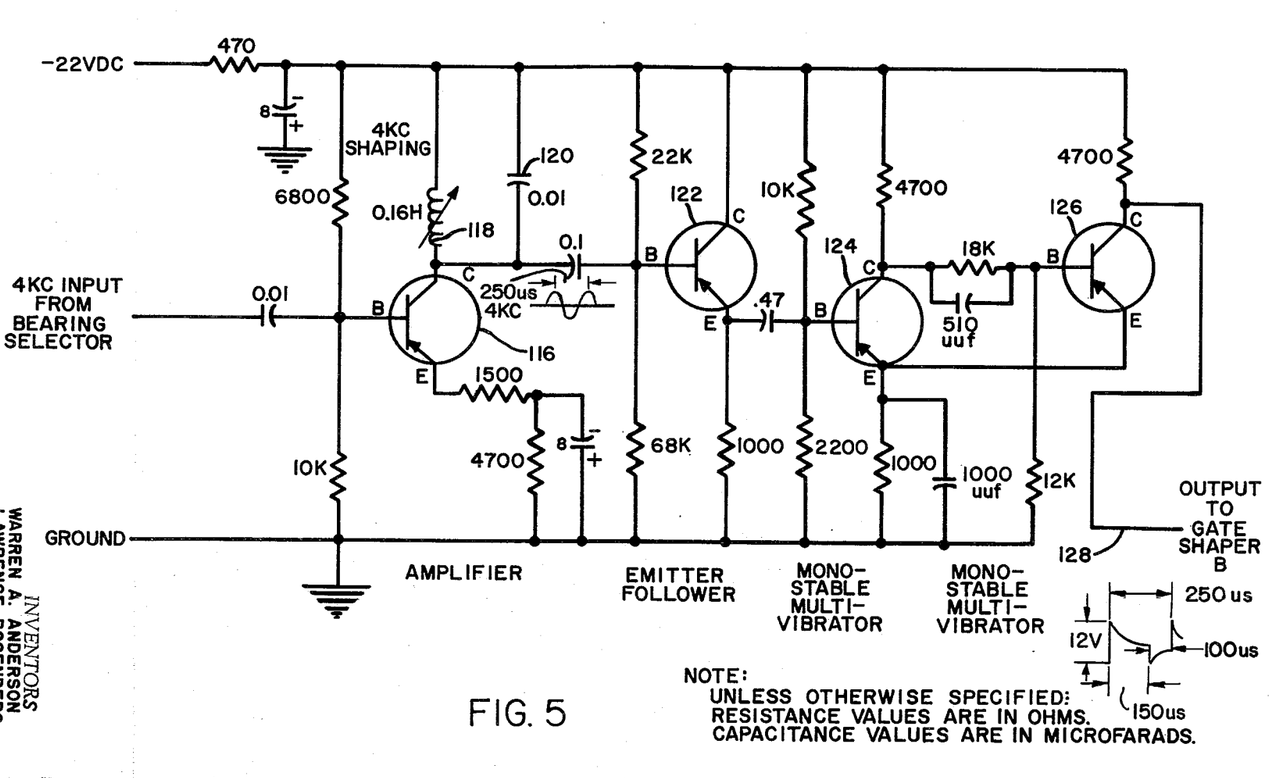
FIG. 5 is a schematic diagram of gate-shaper A of the omni-directional bearing selector.
Figure 6:
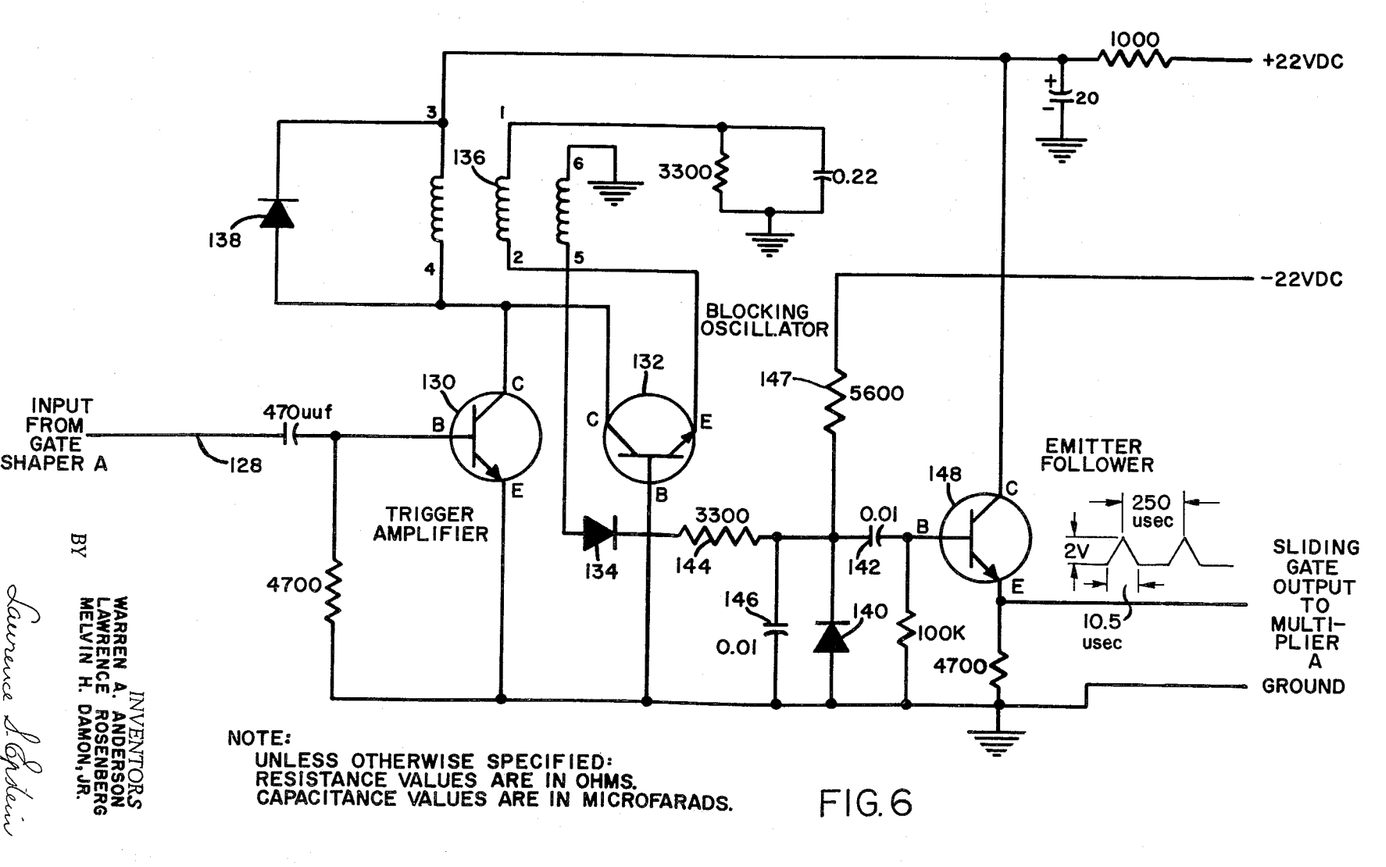
FIG. 6 is a schematic diagram of the gate-shaper B.

The output from phase-splitter B is then applied to phase-shift resolver 62. The output from the 4KC phase-shift resolver is applied to gate-shaper A shown on FIG. 5. The 4KC input from the bearing selector is a sinewave which is applied to the base of amplifier 116. The combination of capacitor 120 and variable inductor 118 in the collector circuit of amplifier 116 is adjustable. The output from the collector of amplifier 116 is applied to the base of emitter-follower 122. The output from emitter-follower 122 is applied to the base of mono-stable multivibrator comprising transistors 124 and 126. The mono-stable multivibrator is used to form a very sharp defining point for the point of triggering the following circuitry. The square-trigger output pulse from the mono-stable multivibrator is applied to gate-shaper B. The first stage of gate-shaper B is the amplifier 130. Amplifier 130 in combination with stage 132 and limiting diode 134 form a blocking oscillator circuit which produces the required gate pulses. The output transformer 136, and diode 138 form part of the blocking oscillator circuit. The blocking oscillator output is in the form of approximately 5-microsecond pulses through transformer 136. When no pulse appears across the output winding 5–6 of transformer 136, diodes 134 and 140 are both conductive because of the potential from the negative 22 volt supply, and capacitor 146 has substantially a zero charge. When the leading edge of the blocking oscillator 5-microsecond pulse, which is about 40 volts, positive in amplitude, appears on winding 5–6, and when the voltage across the capacitor 146 begins to go positive, diode 140 is back-biased and becomes non-conductive, thereby permitting the capacitor 146 to be charged linearly through resistor 144, the resistance of which is selected to provide linear charging to about 2 volts in the 5-microsecond charging period. At the instant the charging pulse ends, the capacitor voltage is at its maximum and diode 134 becomes back-biased and non-conducting, thereby leaving resistor 147 as the only path for discharge of capacitor 146. Resistor 147 is selected to provide an RC time constant which will effect linear discharge of the capacitor 146 during an approximate period of another 5-microseconds, thereby providing approximately a 10-microsecond triangular signal. The triangular signal is passed by D.C. blocking capacitor 142 to the base of an emmitter follower 148 and results in a triangular wave-shaped pulse output from emitter-follower 148. The purpose of emitter follower 148 is to avoid loading of the blocking oscillator output and consequent distortion of the triangular signal developed across capacitor 146. This triangular output pulse is applied to the multipliers A and B.

Figure 2:
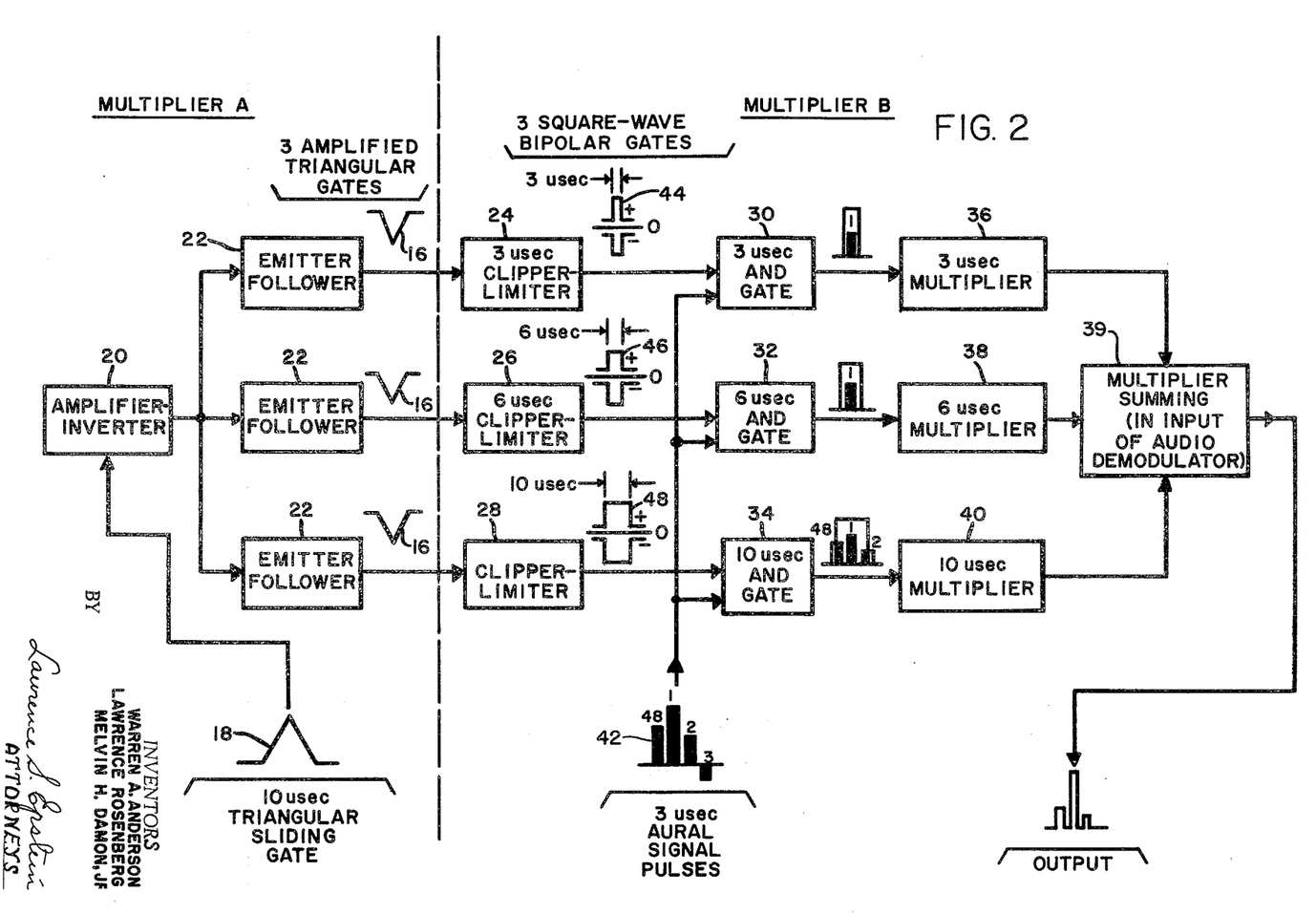
FIG. 2 is a block diagram of multipliers A and B.

Multipliers A and B have two inputs. One input is the triangular sliding gate from gate-shaper B, 56. The other input is the combined aural signal 42. In the preferred embodiment of the invention, rectangular sliding gates of 3, 6 and 10 microsecond widths are generated from the triangular sliding gate. To accomplish this the triangular gate 18 is first passed through the amplifier inverter stage 20 in multiplier A. The amplified and inverted output, now negative is applied to three identical emitter-follower stages 22. The outputs are three identical triangular gate signals which are fed to three clipper limiter stages, respectively 24, 26 and 28. The triggering levels of these stages are adjusted to produce the required 3, 6 and 10 microsecond square-wave gating signals. In addition to the clipper limiter stages, multiplier B has three AND gates and three multiplier networks. The AND gates, respectively 30, 32 and 34 produce an output when two signals are applied which coincide in time. One input to each gate is a square-wave gating signal, 3, 6 or 10 microseconds wide. The second input is the combined aural signal 42. When the triangular sliding gate is moved along the time axis the three square-wave gates move in exact coincidence, thus scanning the combined aural pulse train which is fixed in relative time. The outputs are fed to the respective multipliers 36, 38 and 40 which are conveniently in the form of voltage dividing resistance networks and hence multiply by fractions. The multipliers are adjusted so that their common output will be approximately the same level as the AND gate inputs when an aural pulse is coincident with all three gates. The common output of the multipliers will be approximately two-thirds of the AND gate level when an aural pulse is coincident with the 6 and 10 microsecond gates. The common output of the multipliers will be approximately one-third of the AND gate level input when an aural pulse is coincident only with the 10 microsecond gate. The purpose and net result of the three overlapping but different width gating signals is to provide a smooth transition between ouputs as a trainee, for example, operates the bearing selector means to traverse the different information input channels.

Thus it is seen by the use of simplified circuitry, the bearing selector circuitry for training purposes provides a controllable, variable, sliding triangular gate which controls the amount of channel information provided for listentling on an operational sonar set.

Thus it is seen that a novel circuit is provided in which a triangular sliding gate is utilized for control of bearing information. The novel circuitry utilized in the instant invention can also be utilized in other devices and applications where it is required to select and mix different audio channel information in a controllable manner.

Obviously many modifications and variations of the present invention are possible in the light of the above teachings. It is therefore to be understood that within the scope of the appended claims the invention may be practiced otherwise than as specifically described.

What is claimed is:

1. An electronic circuit for use with apparatus having timing signal generating clock means and means for combining waveform information from a plurality of input channels into a single pulse train signal wherein time displacements of particular recurrent pulses along the pulse train signal time base, as established by said clock means, are indicative of the channels from which the particular pulses were derived, said electronic circuit comprising:

phase-splitter means responsive to said timing signal to provide two, timed, sine wave signals of equal magnitude but having a predetermined phase difference;

phase-shift resolver means connected to said phase-splitter means and having a stator and a rotor, said resolver being responsive to said timed sine wave signals and to the position of said rotor to provide a resolver ouput signal which is phase-shifted with respect to said time base in accordance with the position of said rotor;

gate shaping means connected to said phase-shift resolver means and responsive to said resolver ouput signal to provide a sliding gate signal which is positioned along said time base in accordance with the position of said rotor;

multiplier means for receiving said pulse train signal and connected to said gate shaping means and responsive to said sliding gate signal so as to provide an output corresponding to coincidence of said sliding gate signal and pulses of said pulse train signal, whereby positioning of said rotor can be utilized to select from said pulse train signal those pulses derived from particular ones of said plurality of input channels;

said multiplier means comprising means for forming said gate signal into a plurality of gate signals of differing widths and signal levels for passing coincident pulses within those widths, and summing means for summing the pulses so passed to provide smooth transition between different outputs resulting from changes in said rotor position.

2. An electronic circuit as defined in claim 1, and further comprising:

electromechanical servo means for selectively positioning said rotor.

* * * * *